United States Patent [19]

Lane, III

[11] 4,210,917
[45] Jul. 1, 1980

[54] MULTICOLOR MULTIPOINT RECORDER

[75] Inventor: Charles E. Lane, III, Meadowbrook, Pa.

[73] Assignee: Honeywell Inc., Minneapolis, Minn.

[21] Appl. No.: 24,547

[22] Filed: Mar. 28, 1979

Related U.S. Application Data

[62] Division of Ser. No. 928,849, Jul. 28, 1978.

[51] Int. Cl.² .................. G01D 9/00; G01D 9/28; G01D 13/02; B41J 27/00
[52] U.S. Cl. .................. 346/34; 346/46; 346/61; 346/141; 400/470
[58] Field of Search .................. 346/34, 46, 61, 141; 400/208, 240.2, 470

[56] References Cited

U.S. PATENT DOCUMENTS

| | | | |
|---|---|---|---|
| 479,351 | 7/1892 | Dennis | 400/470 |
| 1,413,646 | 4/1922 | Wood | 346/46 |
| 2,358,243 | 9/1944 | Moore | 346/34 X |
| 2,759,586 | 8/1956 | Juengerkes | 400/240.2 |
| 3,144,296 | 8/1964 | Hohl | 346/46 UX |
| 3,577,149 | 5/1971 | Carpino | 346/34 X |
| 3,611,412 | 10/1971 | Gibby | 346/61 |
| 3,761,949 | 9/1973 | Hasebe et al. | 346/46 |
| 3,838,430 | 9/1974 | Digney | 346/141 X |
| 4,000,494 | 12/1976 | Digney | 346/46 X |

*Primary Examiner*—George H. Miller, Jr.
*Attorney, Agent, or Firm*—Laurence J. Marhoefer; Lockwood D. Burton; Mitchell J. Halista

[57] ABSTRACT

A multipoint recorder has a multicolor ink cartridge arranged to be selectively aligned with a recording head having a plurality of selectively energizable recording elements whereby a color from the multicolor ink cartridge is selected for printing by the recording elements. A fixed color operation of the recorder enables a recording to be made in a single color by maintaining a preselected alignment of the recording head and a desired color in the multicolor ink cartridge. Alternatively, the color of the recording can be selectively altered at any time to produce a multicolor recording by selecting a corresponding color from the multicolor ink cartridge for each recording.

6 Claims, 5 Drawing Figures

MULTICOLOR MULTIPOINT RECORDER

This is a divisional of application Ser. No. 928,849 filed on July 28, 1978.

BACKGROUND OF THE INVENTION

1. Field of the Invention

The present invention relates to multipoint strip chart recorders. More specifically, the present invention is directed to a multipoint recorder for recording each of a plurality of input signals in respective ones of a plurality of colors.

2. Description of the Prior Art

Print mechanisms embodying record distinguishing means for multipoint, i.e., multiple input, strip chart recorders have been known and employed for many years. Such print mechanisms generally have operated in a single recording mode and have identified each recorded input quantity under measurement by characteristic mark or color. Multipoint recorders of the multicolor type have previously employed ink wheels which contain ink pads thereof different colors arranged along the periphery of the ink wheel. A selected color is arranged to contact a desired mark on a print wheel before that mark is brought in the printing contact with the record medium, e.g., U.S. Pat. Nos. 3,611,412 and 3,991,676. However, such prior art recorders used a peripherally segmented ink wheel wherein a rotation of the ink wheel was required before the desired color could be aligned with the printing mark. Further, the print indicia on the print wheel was arranged to contact the ink wheel before contact was made between the print wheel and the recording medium. Such a printing mechanism required a complex drive system for achieving the required mechanical interactions. A prior art attempt to simplify the printing mechanism wherein a plurality of print hammers were arranged on one side of the recording medium along with a multicolor ink ribbon or band while the desired print characters were located on the other side of the recording medium on a moving belt is shown in U.S. Pat. No. 3,991,676. However, this prior art recorder also involved a complex and expensive mechanical system including a print head mechanism having hammers arranged across the entire width of the recording medium which produce an uneconomical recording head structure.

SUMMARY OF THE INVENTION

An object of the present invention is to provide an improved multipoint recorder having multicolor capabilities which has a simplified recording head structure and drive system for the recording head.

Another object of the present invention is to provide an improved multicolor ink cartridge for providing multicolor capability for the multipoint recorder.

In accomplishing these and other objects, there has been provided, in accordance with the present invention, a multipoint recorder having a multicolor ink cartridge located on one side of the recording medium while a recording head having a combination of selectively actuable recording elements is located on the other side of the recording medium and aligned with the ink cartridge. The ink cartridge and the recording head are both located on respective guides in combination with a linear drive structure for positioning the ink cartridge and recording head along the recording line on a recording medium. The drive structure also includes a second drive means for selectively aligning the recording head with one of the ink colors on the ink cartridge.

BRIEF DESCRIPTION OF THE DRAWINGS

A better understanding of the present invention may had when the following detailed description is read in connection with the accompanying drawings in which.

DESCRIPTION OF THE PREFERRED EMBODIMENT

Figure 1:
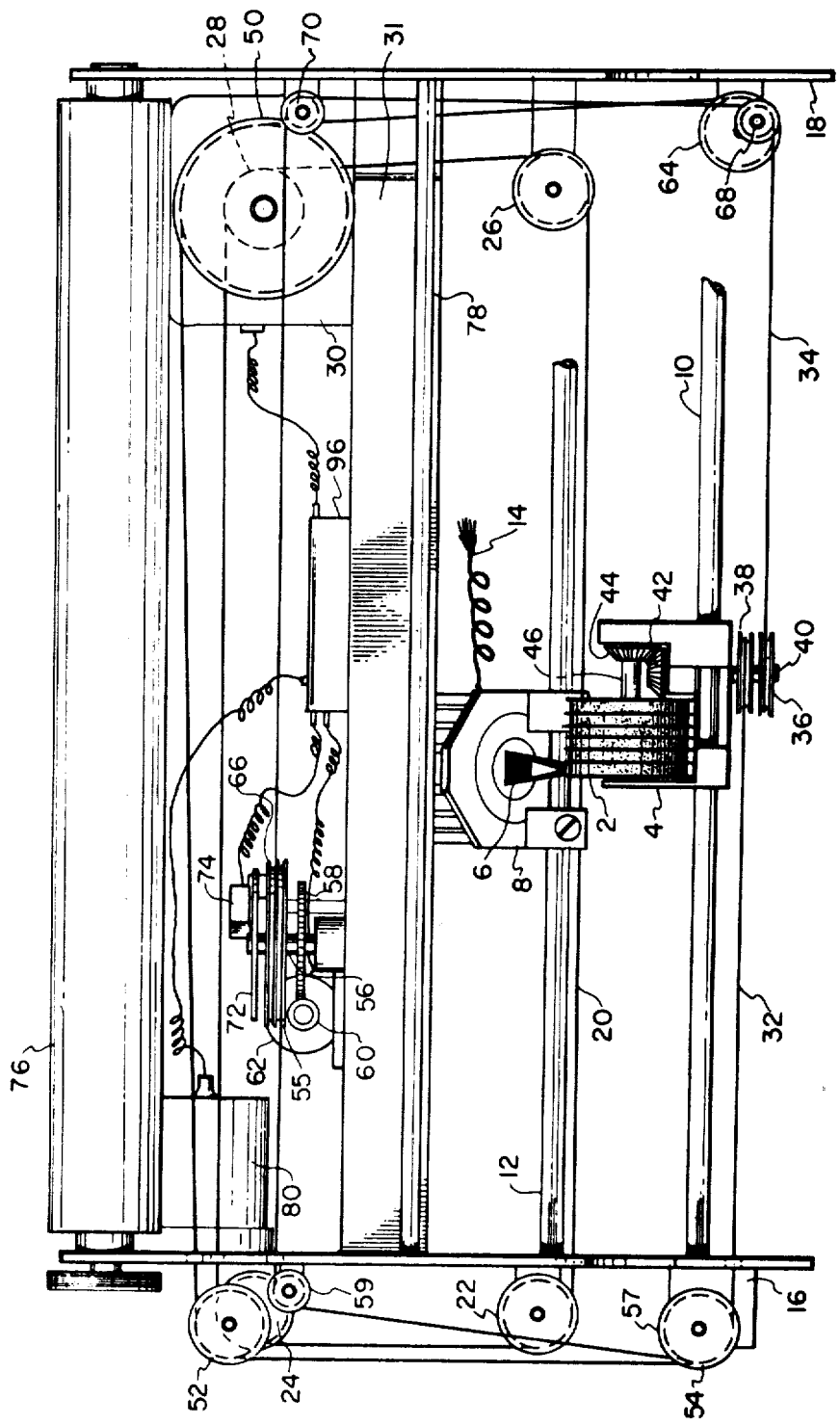
FIG. 1 is a pictorial illustration of a front view of a multipoint recorder embodying an example of the present invention.

In FIG. 1, there is shown a front view illustration of a multipoint recorder embodying an example of the present invention and having an ink cartridge, or wheel, 2 arranged on an ink cartridge carriage 4 for movement across a recording medium (not shown) along a recording line. A recording head 6 is located on a recording head carriage 8 which is also arranged to be driven across the recording medium along the recording line. The recording head 6 with the recording head carriage 8 and the ink cartridge 2 with the ink cartridge carriage 4 are located on opposite sides of the recording medium, e.g., the ink cartridge carriage 4 may be located on the side of the recording medium facing an operator while the recording head carriage 8 can be located on the hidden, or rear side, of the recording medium. The ink cartridge carriage 4 is slidably supported on a guide rail 10 to enable the ink cartridge carriage 4 to be moved across the recording medium. Similarly, the recording head carriage 8 is slidably supported on a guide rail 12 whereby the recording head carriage 8 may be moved across the recording medium. The recording head 6 is connected by a multiconductor cable 14 to any suitable means (not shown) for selectively energizing the recording pins in the recording head 6 to produce a desired recording on the recording medium. Such recording heads are well-known in the art, e.g., the alpha-numeric recording head manufactured by Hydra Corp. of Mountain View, Ca., and a further discussion thereof is believed to be unnecessary.

The guide rails 10 and 12 are monted between a pair of parallel end plates 16 and 18 which define the width of the recorder and provide support for the various elements of the recorder, as hereinafter described. The recording carriage 8 is connected to a first drive cable 20 which is selectively driven to move the recording head carriage 8 along the guide rail 12. The drive cable 20 is supported in a closed loop configuration by guide rollers 22, 24 and 26 mounted on the end plates 16 and 18. Additionally, the ends of the drive cable 20 are attached to a drive drum 28 mounted on an output shaft of a motor 30 mounted on a shelf 31 located between the end plates 16, 18. The ends of the drive cable 20 are attached to the drive drum 28 after a sufficient number of turns of the drive cable 20 on the drum 28 to provide for a cable reserve adequate to drive the recording head carriage 8 from one side of the recording medium to the other.

The ink cartridge carriage 4 is driven by a second cable system using a second drive cable 32 and a third drive cable 34. A pair of pulleys 36 and 38 are coaxially mounted on the ink cartridge carriage 4 by means of a support shaft 40 and respective one-way clutches (not shown) located within each of the pulleys 36, 38 to connect the pulleys 36, 38 to one end of the shaft 40. The shaft 40 is arranged to pass through the ink cartridge 4 to drive a first one of a pair of meshed bevel gears 42, 44. The bevel gears 42, 44 change the drive direction from the axis of the shaft 40 connected to a first bevel gear 42 to the axis of a shaft 46 connected to a second bevel gear 44 and located at a 90° angle with respect to the axis of the shaft 40. The ink cartridge 2 is attached to the shaft 46 and is arranged to rotate therewith. the ink cartridge 2 includes a plurality of ink supply layers containing respective ink colors separated by ink impervious separators as more fully described hereinafter with respect to FIG. 5. The cartridge 2 is arranged to contact the recording medium on the opposite side thereof from the recording head 6 whereby the selective energization of the recording head 6 is arranged to drive the recording medium into contact with a corresponding one of the ink containing layers previously aligned with the recording head 6 to produce a record mark on the recording medium.

A first drive cable 32 is disposed around the pulley 38 and has one end attached to a second drive drum 50 coaxially located on the output shaft of the motor 30 adjacent to the first drive drum 28. However, the diameter of the second drive drum 50 is arranged to be twice that of the first drive drum 28 as discussed hereinafter. The length of the drive cable 32 between the drive drum 50 and the pulley 38 is supported by a pair of guide rollers 52 and 54 mounted on the end plate 16. The other end of the drive cable 32 is attached to a third drive drum 55 which is mounted on a shaft 56. The length of the cable 32 between the pulley 38 and the drive drum 55 is supported by a pair of guide rollers 57, 59. The shaft 56 is driven by a coaxial gear 58 which, in turn, is driven by a worm gear 60. The worm gear 60 is mounted on an output shaft of a second drive motor 62.

The second drive cable 34 is similarly connected at one end to the second drive drum 50 and is supported between the second drive drum 50 and the pulley 36 by a guide roller 64 mounted on the end plate 18. The other end of the second drive cable 34 is connected to a fourth drive drum 66 coaxially arranged with the third drive drum 54 on the shaft 56. A pair of guide rollers 68 and 70 mounted on the end plate 18 are arranged to support the cable 34 between the pulley 36 and the fourth drive drum 66. Such clutches are well-known in the art such as the roller clutch manufactured by the Torrington Co., Torrington, Conn. A code wheel 72 for providing a representation of the position of the shaft 56 is also coaxially mounted above the drive drums 54 and 66 on the shaft 56. A code wheel sensor 74 is arranged adjacent to the code wheel 72 to sense its operation. The code wheel 72 and sensor 74 may each be any suitable prior art device, such devices being well-known in the art.

Figure 3:
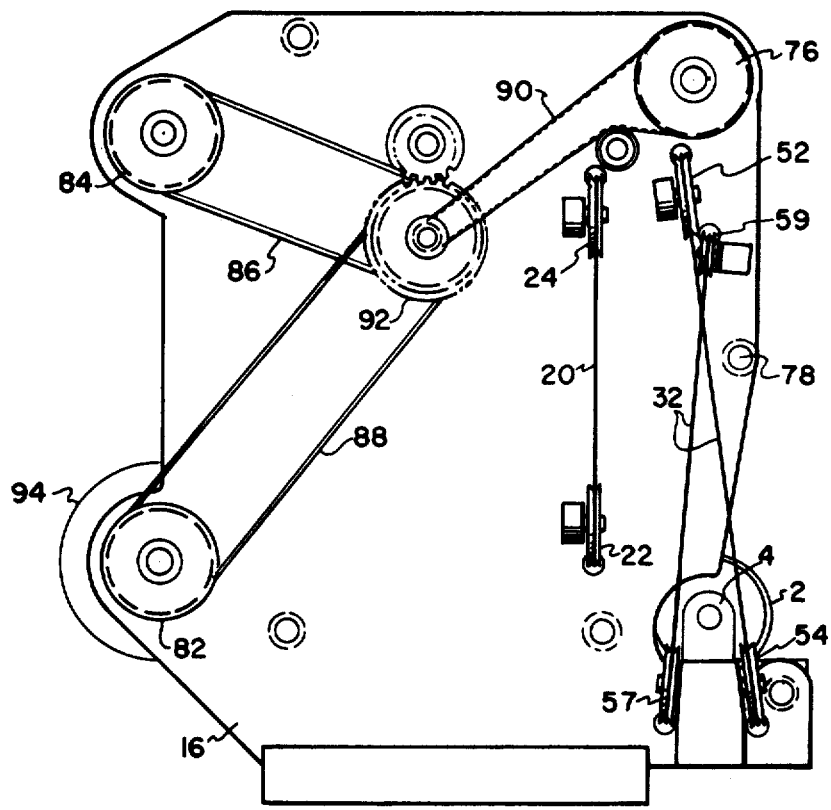
FIG. 3 is a side view of the left-hand side of the recorder shown in FIG. 1.
Figure 5:
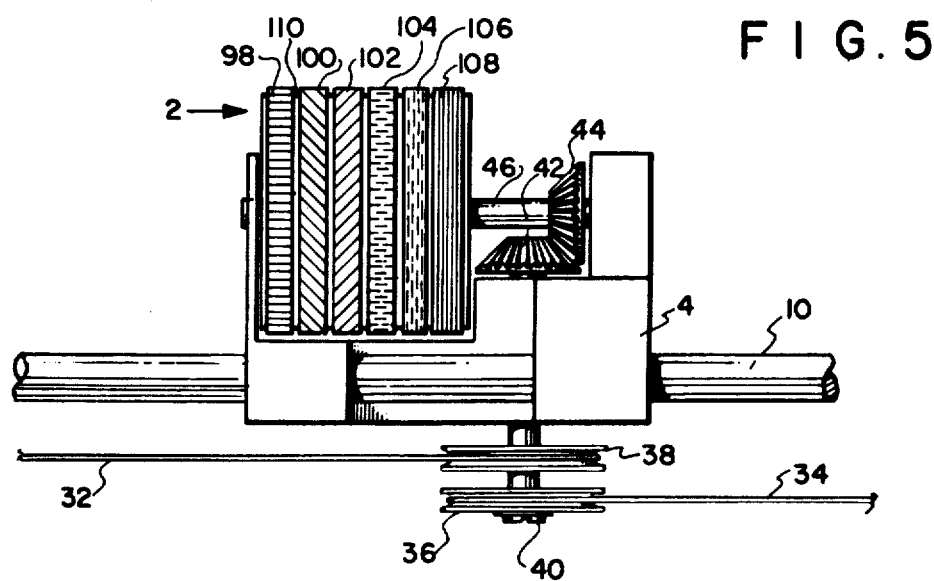
FIG. 5 is a pictorial illustration of an example of an ink cartridge for use with the multipoint recorder shown in FIG. 1.

A plurality of recording medium support rollers, e.g., rollers 76 and 78, are also supported between the end plates 16 and 18 to define a recording medium path as shown in FIG. 5. A recording medium drive includes a drive motor 80 mounted on the end plate 16 and arranged to drive support roller 76 and paper supply and take-up reels 82 and 84, as shown in FIG. 3, by suitable flexible belts 86, 88 and 90 which are driven from a drive pulley 92. A roll of the recording medium 94 is shown in diagrammatic form in FIG. 3 on reel 82. The detailed showing of the path taken by the recording medium 94 is shown in diagrammatic form in FIG. 4 and is provided for the purpose of illustrating the specific tape path between the tape reels 82 and 84 and the passage between the recording head 6 and the ink cartridge 2.

Figure 2:
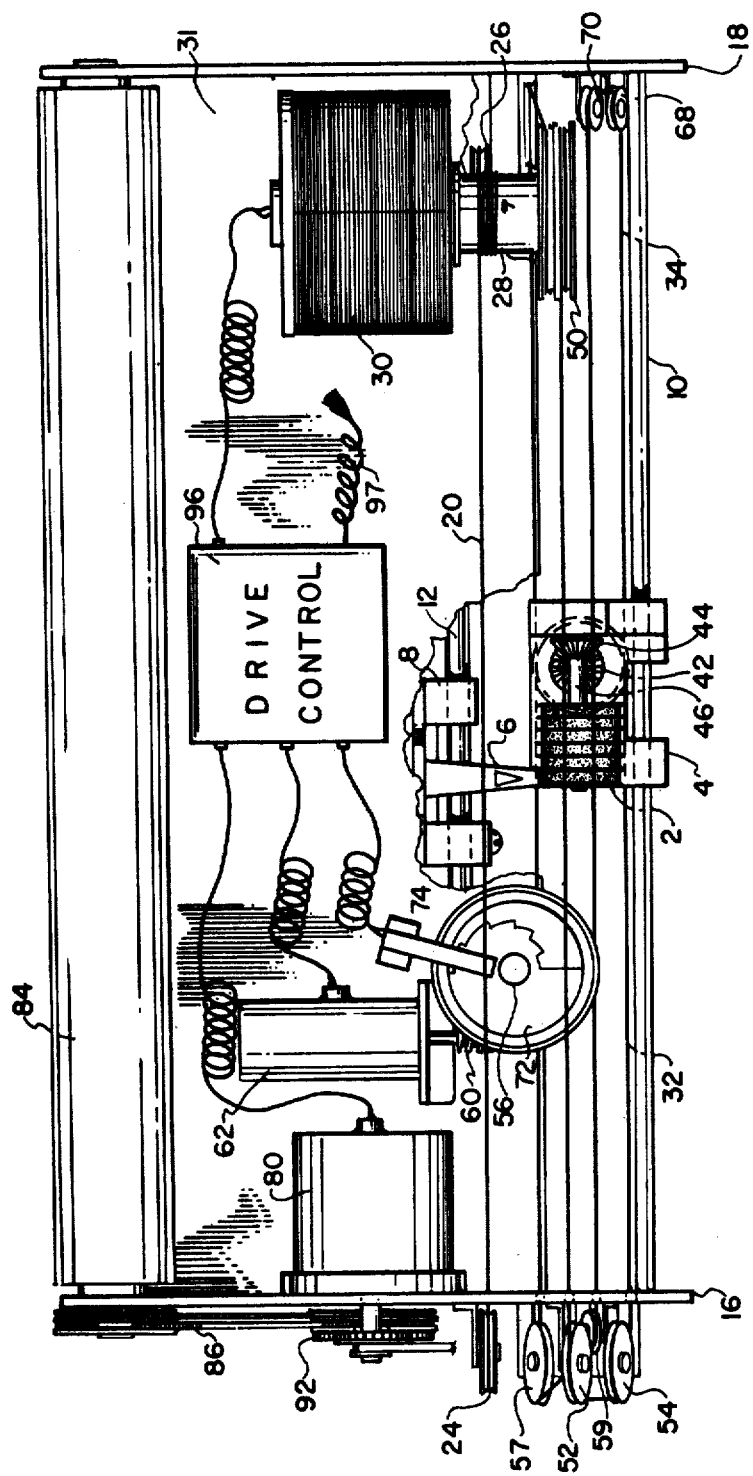
FIG. 2 is a top view of the recorder shown in FIG. 1.

The motors 30, 62, and 80 and the code wheel sensor 74 are all connected to a drive control means 96 mounted on the shelf 31 as shown in illustrative form in FIGS. 1 and 2. The drive control means 96 may be any suitable prior art electrical control for selectively energizing the recording medium drive motor 80 to drive the recording medium 94, for selectively energizing the drive motor 34 to drive the combination of the recording head 6 and ink cartridge 2 across the recording medium in response to an input signal to position the recording head 6 at a point along the recording line on the recording medium at which a recording is desired, and for selectively energizing the recording head 6 when the recording point along the recording line is reached. Additionally, the drive control means is used to selectively energize the drive motor 62 to effect a reorientation of the recording head 6 and a desired one of the ink carrying layers on the ink cartridge 2 to produce a color change of the recording. The details of the drive control 96, are conventional, and a detailed discussion thereof is believed to be unnecessary in order to provide an understanding of the present invention. Thus, the drive control 96 may include well-known circuits for comparing the position of the recording head 6 as determined by the position of the drive motor 30 with an input signal to be recorded applied on a input cable 97 whereby the amplitude if the input signal is recorded on the recording medium 94 at a point represented by an amplitude scale on the recording medium 94. Such a null-balance drive of a recording element along a recording medium is well-known in the art, e.g., the recorder shown in U.S. Pat. Nos. 3,576,582 and 2,427,480. Further, the energization of the paper drive motor 80 to drive the recording medium either continuously or incrementally is also well-known in the art as shown in the aforesaid patents. Finally, the selective drive of the color change motor and the sensing of the position of the code wheel by means of the sensor 74 during a color change operation involving a selectively reorienting of the ink cartridge 2 and recording head 6 by the illustrated example of the present invention is also performed by any suitable well-known electrical circuits in response to an input control signal indicative of the need for a color change. For example, a digitally coded control signal could be selectively applied to the input cable 97 to order a color change. The digital code sensed by the sensor 74 from the code wheel 72 is compared by the drive control 96 to the control signal by any suitable code comparator. A motor drive signal is produced in response to this comparison operation and is applied to the drive motor 62 until a code comparison indicates that the desired color position has been attained. At this time, the color change motor drive signal would be terminated until the next color change operation. The one-way drive relationship of the worm gear 60 and the gear 58 would mechanically maintain the desired recording color position.

In FIG. 5, there is shown a detailed representation of ink cartridge 2 which is mounted on the ink cartridge carriage 4 for linear movement therewith along guide rail 10 and for rotation on shaft 46 in response to the differential operation of the pulleys 36, and 38. The ink cartridge 2 includes a plurality of concentric ink filled layers 98, 100, 102, 104, 106 and 108. These ink filled layers may each contain a respective color of recording ink. The ink layers 100, etc. are separated from each other by ink impervious spacers, or washers, for example, the ink layer 98 is separated from ink layer 100 by spacer 110. Thus, the spacers are effective to prevent migration of ink from one layer to another. The spacers may be made of aluminum, while the ink layers may be any suitable ink-retaining material in a washer-shaped configuration, e.g., the microporous material identified as Day-Flo #175 manufactured by the Dayco Corp. of Dayton, Ohio. The spacers and ink layers are attached together by any suitable means, e.g., rivets, and attached to the shaft 46 to be rotated therewith. Thus, the rotation of the ink cartridge 2 by the shaft 46 is effective to spread the wear and ink utilization of the printing operation around the entire periphery of each of the ink layers. The shaft 46 is rotated by the bevel gears 42, 44 which, in turn, are driven by the shaft 40 and pulleys 36, 38. Since the pulleys 36, 38 have one-way clutches therein arranged for opposite clutching operation, only one of the pulleys 36, 38 is effective to drive the shaft 40 at any time since the pulleys 36 and 38 are always rotated in opposite directions by the drive cables 32, 34. However, the shaft 40 and ink cartridge 2 are always driven in the same direction since the one-way clutches convert the opposite motion of the pulleys 36, 38 to a single direction of rotation of the shaft 40.

MODE OF OPERATION

In operation, the recorder apparatus of the present invention is effective to concurrently drive the recording head 6 and the color cartridge 2 across a recording medium along a recording line to produce a recording thereon. Additionally, the recording medium is driven between a supply reel and a take up reel by a recording medium drive system. Further, the orientation of the recording head 6 with the ink layers in the color cartridge 2 is selectively alterable to change the color of the recorded mark on the recording medium.

Figure 4:
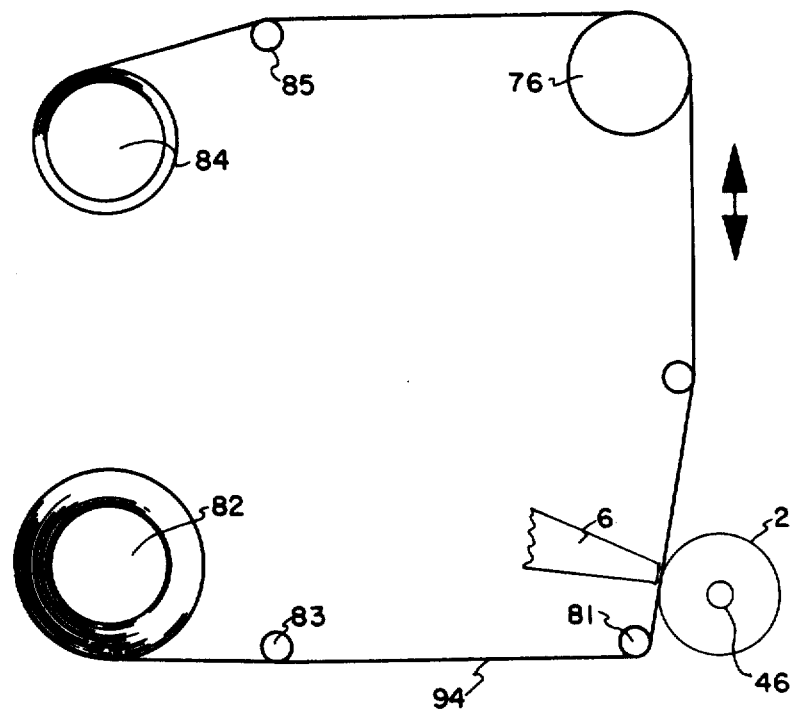
FIG. 4 is a diagrammatic illustration of the recording medium path in the recorder shown in FIG. 1.

Specifically, the recording medium drive motor 8 is energized by the drive control means 96 to drive the recording medium past the recording head 6 and the ink cartridge 2 as shown in FIG. 4. Assuming that a single color is to be used for the recording, the recording head 6 is oriented with the desired ink layer in the ink cartridge 2 by a selective energization of the color change motor 62. This energization of the motor 62 is continued until the detection of the code wheel 70 produces an indication to the drive control means 96 that the desired color orientation has been achieved. In other words, the motor 62 is energized in the desired direction to drive the worm gear 60, which, in turn, drives the gear 58 and the pulleys 55 and 66. Since the one end of each of the drive cables 32 and 34 is attached to a respective one of the pulleys 55 and 66, i.e., one end of the drive cable 32 is attached to pulley 55 and one end of the drive cable 34 is attached to pulley 66, this rotation of the pulleys 55 and 66 is effective to roll-up one of the drive cables on the corresponding one of the pulleys and pay-out the other of the drive cables from the corresponding one of the pulleys 55, 66. Since the drive cables 32 and 34 pass around the pulleys 36 and 38, this lengthening and shortening of the drive cables 32, 34 is effective to move the ink cartridge carriage 4 on the guide rail 10 in the direction of the shortening cable. Further, this movement is achieved without moving the recording head carriage 6 whereby a reorientation of the recording head with an ink layer on the ink cartridge 2 is achieved. When the desired ink layer on the ink cartridge 2 has been selected as sensed by a detection of the position of the code wheel 70, the energization of the motor 62 is terminated.

A selection of a position for the recording on the recording medium is achieved by an energization of the motor 30 which is effective to concurrently drive the recording head carriage 8 and the ink cartridge carriage 4 across the recording medium while maintaining a selected orientation of the recording head 6 and an ink layer in the ink cartridge 2. In other words, since the worm gear drive of the pulleys 55 and 66 is effective to maintain the selected position thereof during a non-energized state of the motor 62, the energization of the motor 30 is effective to roll-up and to pay-out the drive cables 32 and 34 therefrom inasmuch as these cables have their other ends attached to the drum 50. This lengthening and shortening of the cables 32 and 34 is again effective to move the ink cartridge carriage 4 on the guide rails 10. However, during this ink cartridge carriage motion induced by the drive motor 30, the recording head carriage 8 is concurrently moved on guide rail 12 by the paying-out and rolling-up of the drive cable 20 on the drum 28 inasmuch as the ends of the drive cable are attached to the drum 28. Since the lengthening and shortening of these drive cables 32 and 34 has to achieve the same degree of motion as the drive induced by the cable 20 to maintain a selected recording head and print head orientation, the diameter of the drum 50 is arranged to be twice the diameter of the drum 28 to compensate for the two cable action producing the motion of the ink cartridge carriage 4.

It should be noted that during either the color selection operation or the recording operation, the rotation of the pulleys 36 and 38 is effective to rotate the ink cartridge 2 to distribute the recording wear on the ink layers, as previously discussed. Such a rotation also allows an ink reflow to provide replenishment of the ink at the surface of each ink layer. It should also be noted that the layers may be of different widths to offset an unequal use of a particular color by spreading the recording wear across the respective layer width and periphery. Further, the selection of an ink layer in the color cartridge 2 and the motion of the recording head 6 to a new recording position may be achieved concurrently by a concurrent energization of the drive motors 30 and 62. Additionally, since such a matrix recording head is capable of multi-symbol recording, the recorder may use a bi-directional recording medium drive for producing either real-time or historical displays of graphs, charts, block diagrams, etc. Finally, while the illustrative example of the invention shown herein uses a null-balance recording technique, other recording techniques such as a scan, or on-the-fly, recording, wherein the recording head is simply driven across the recording medium and a recording effected at the appropriate place, may also be used without departing from the scope of the present invention.

Accordingly, it may be seen that there has been provided, in accordance with the present invention, a multipoint recorder having multicolor capabilities with a simplified recording head structure and drive system for the recorder.

The embodiments of the invention in which an exclusive property or privilege is claimed are defined as follows:

1. A multicolor ink cartridge comprising:
   a support shaft,
   a plurality of parallel ink containing layers attached to said shaft, and
   a plurality of ink impervious layers attached to said shaft for separating adjacent ones of said ink containing layer.

2. A multicolor ink cartridge as set forth in claim 1 wherein said ink impervious layers are aluminum washers.

3. A multicolor ink cartridge as set forth in claim 1 wherein said ink containing layers are each impregnated with a respective ink color.

4. A multicolor ink cartridge as set forth in claim 1 wherein said support shaft includes a drive gear attached thereto for imparting a rotational motion to said shaft upon an engagement of said gear with a gear drive means.

5. A multicolor ink cartridge as set forth in claim 1 wherein said ink layers and said impervious layers are orthogonal to said shaft.

6. A multicolor ink cartridge as set forth in claim 5 wherein said ink layers and said impervious layers are coaxial with said shaft.

* * * * *